(12) United States Patent
Murata

(10) Patent No.: US 9,976,623 B2
(45) Date of Patent: May 22, 2018

(54) CYLINDER DEVICE

(71) Applicant: HITACHI AUTOMOTIVE SYSTEMS, LTD., Hitachinaka-shi, Ibaraki (JP)

(72) Inventor: Hiroshi Murata, Kawasaki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days. days.

(21) Appl. No.: 15/118,347

(22) PCT Filed: Feb. 12, 2014

(86) PCT No.: PCT/JP2014/053174
§ 371 (c)(1),
(2) Date: Aug. 11, 2016

(87) PCT Pub. No.: WO2015/121922
PCT Pub. Date: Aug. 20, 2015

(65) Prior Publication Data
US 2017/0175841 A1 Jun. 22, 2017

(51) Int. Cl.
*F16F 9/38* (2006.01)
*F16F 9/19* (2006.01)

(52) U.S. Cl.
CPC .............. *F16F 9/38* (2013.01); *F16F 9/19* (2013.01); *F16F 2224/0241* (2013.01); *F16F 2226/04* (2013.01); *F16F 2230/0023* (2013.01)

(58) Field of Classification Search
CPC .. F16F 9/38; F16F 9/19; F16F 2226/04; F16F 2224/0241; F16F 2230/0023

(Continued)

(56) References Cited

U.S. PATENT DOCUMENTS 6,199,672 B1 * 3/2001 Wada .................. F16F 9/38
188/322.12
8,657,270 B2 * 2/2014 Takada .................. F16F 9/38
188/322.12

(Continued)

FOREIGN PATENT DOCUMENTS

JP 55-154838 11/1980
JP 61-16439 U 1/1986

(Continued)

OTHER PUBLICATIONS

Notice of Reasons for Rejection dated Apr. 25, 2017 in Japanese Application No. 2015-562584, with partial English translation (4 pages).

(Continued)

*Primary Examiner* — Pamela Rodriguez
(74) *Attorney, Agent, or Firm* — Mattingly & Malur, PC

(57) ABSTRACT

A mounting section mounted on a rod side is provided at one end side of a protective cover in an axial direction. At least the other end side of the protective cover in the axial direction has reduced diameter parts and enlarged diameter parts, the reduced diameter parts and the enlarged diameter parts being alternately formed in the axial direction via small diameter parts in between. An end surface of the other end side of the protective cover is formed by a surface that is cut at a position. The end surface and an outer circumferential surface of a cylinder are situated at a position at which they are not in contact with each other in the radial direction in a state in which the small diameter part closest to the end surface comes into contact with the outer circumferential surface of the cylinder.

5 Claims, 7 Drawing Sheets

(58) Field of Classification Search
USPC ............ 267/217, 221; 280/124.157, 124.158
See application file for complete search history.

(56) References Cited

U.S. PATENT DOCUMENTS

| | | | | |
|---|---|---|---|---|
| 2015/0068855 A1* | 3/2015 | Matsumura | ............... | F16F 9/38 |
| | | | | 188/322.12 |
| 2015/0240903 A1* | 8/2015 | Nagai | ..................... | F16F 1/126 |
| | | | | 188/322.12 |
| 2015/0267770 A1* | 9/2015 | Nagamachi | ............... | F16F 9/38 |
| | | | | 188/297 |

FOREIGN PATENT DOCUMENTS

| | | |
|---|---|---|
| JP | 2000-81071 A | 3/2000 |
| JP | 2002-130359 | 5/2002 |
| JP | 2006-248401 | 9/2006 |

OTHER PUBLICATIONS

Machine Translation of JP 2006-248401 A, published Sep. 21, 2006 for "Elastic Connecting Device for Shock Absorber," (11 pages).
International Search Report for PCT/JP2014/053174, dated Apr. 8, 2014, 4 pages.
Journal of Technical Disclosure (JP language), No. 2005-501021, Feb. 14, 2005, 6 pages.

\* cited by examiner

CYLINDER DEVICE

This application is the U.S. national phase of International Application No. PCT/JP2014/053174 filed 12 Feb. 2014, which designated the U.S., the entire contents of which is hereby incorporated by reference.

TECHNICAL FIELD

The present invention relates to a cylinder device.

BACKGROUND ART

There is a cylinder device in which a rod is covered with a protective cover (e.g., see Non-patent Literature 1).

CITATION LIST

Non-Patent Literature

[Non-patent Literature 1]
Journal of Technical Disclosure No. 2005-501021

SUMMARY OF INVENTION

Technical Problem

In the cylinder device, an improvement in quality has been demanded.

The prevent invention provides a cylinder device, the quality of which is capable of being improved.

Solution to Problem

According to a first aspect of the present invention, a cylinder device includes: a cylinder; a rod configured to extend from the cylinder; and a tubular protective cover covering the rod and the cylinder being mounted on the rod side; wherein a mounting part mounted on the rod side is provided at one end side of the protective cover in an axial direction; at least the other end side of the protective cover in the axial direction has reduced diameter parts whose diameters are reduced toward tip sides of the other ends and enlarged diameter parts whose diameters are enlarged toward the tip sides of the other ends, the reduced diameter parts and the enlarged diameter parts being alternately formed in the axial direction via small diameter parts in between; an end face of the other end side of the protective cover is formed by a surface that is cut at a position other than the small diameter parts; and the end face and an outer circumferential surface of the cylinder are situated at a position at which the end face and the outer circumferential surface of the cylinder are not in contact with each other in the radial direction in a state in which the small diameter part closest to the end face comes into contact with the outer circumferential surface of the cylinder.

According to a second aspect of the present invention, the protective cover may be formed of a resin material.

According to a third aspect of the present invention, the mounting part of the protective cover may be oscillatably fitted onto the rod side.

According to a fourth aspect of the present invention, at least the other end side of the protective cover may be bendable with flexibility.

According to a fifth aspect of the present invention, the protective cover may include constant diameter parts that are provided between the enlarged diameter parts and the reduced diameter parts, that have larger diameters than the small diameter parts, and that extend with the constant diameter in the axial direction.

According to a sixth aspect of the present invention, the plurality of small diameter parts may be partly provided in a circumferential direction.

According to a seventh aspect of the present invention, the protective cover may be formed by blow molding.

Advantageous Effects of Invention

According to the aforementioned cylinder device, it is possible to improve a quality.

DESCRIPTION OF EMBODIMENTS

First Embodiment

A first embodiment of the present invention will be described below with reference to FIGS. 1 to 4.

Figure 1:
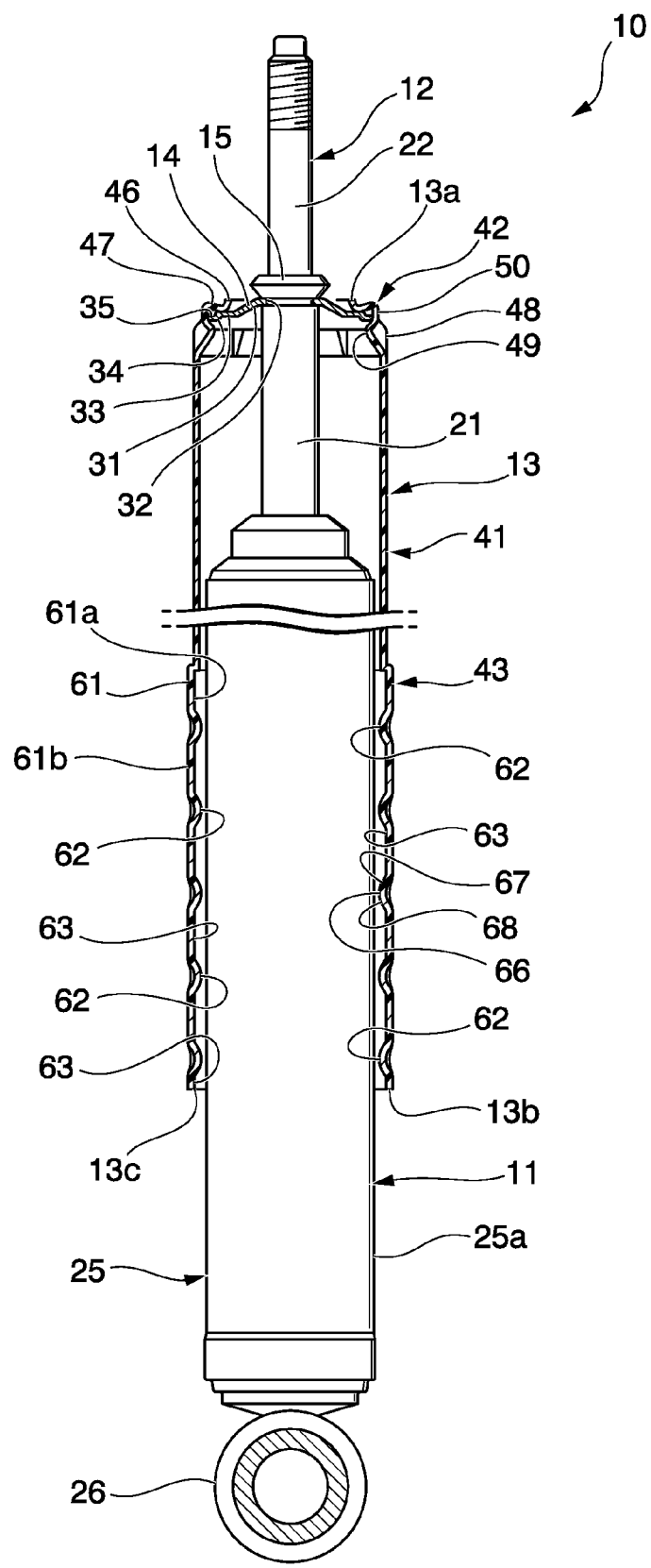
FIG. 1 is a front view illustrating a cylinder device of a first embodiment according to the present invention with a protective cover and a head cap illustrated in a cross section.

As illustrated in FIG. 1, a cylinder device 10 of the first embodiment has a cylinder 11, a rod 12 that extends from one end side of the cylinder 11 in an axial direction to the outside of the cylinder 11 with a central axis matched with the cylinder 11, a tubular protective cover 13 that is mounted to the rod 12 side and covers the rod 12 and the cylinder 11, a disk-shaped head cap 14 for attaching the protective cover 13 to the rod 12, and an annular mounting member 15 for fixing the head cap 14 to the rod 12.

The rod 12 is made of a metal. One end side of the rod 12 in the axial direction is inserted into the cylinder 11, and the other end side of the rod 12 extends outward from the cylinder 11. The rod 12 has a small diameter shaft part 22 that is formed in a predetermined range of a portion extending from the cylinder 11 at the opposite side of the cylinder 11 and has a smaller diameter than a large diameter shaft part 21 of the cylinder 11 side. A piston (not shown) is mounted on an axial end of the rod 12 which is inserted into the cylinder 11. The rod 12 moves integrally along with this piston. The cylinder device 10 serves as a shock absorber that generates a damping force with respect to movement relative to the rod 12 and the cylinder 11 of the piston (not shown).

The cylinder 11 has a cylinder body 25 which houses the piston (not shown) and into which the rod 12 is inserted, and a mounting eye 26 that is fixed to the opposite side of the side to which the rod 12 of the cylinder body 25 extends in the axial direction. An outer circumferential surface 25*a* of the cylinder body 25 includes a cylindrical surface having an approximately constant diameter. The cylinder body 25 is made of a metal, and an outer surface including the outer circumferential surface 25*a* is painted and covered with a painted film.

The head cap 14 is made of a metal. A tapered conical plate part 31 that slightly protrudes in a plate thickness direction such that an amount of protrusion in the axial direction is increased toward a central side in a radial direction at a central portion is formed at the head cap 14. The head cap 14 has a perforated disk shape in which a through-hole 32 passing through in the axial direction is formed in the radial center becoming an apex position of this conical plate part 31. The head cap 14 has an annular intermediate flat plate part 33 that extends radially outward from an outer circumferential edge of the conical plate part 31 in a plane extending in a direction orthogonal to an axis, an annular ring part 34 that slightly protrudes from an outer circumferential edge of the intermediate flat plate part 33 to the side opposite to the conical plate part 31 in the axial direction, and an annular end edge flat plate part 35 that extends radially outward from an end edge of the ring part 34 at the side opposite to the intermediate flat plate part 33 in the axial direction in a plane extending in a direction orthogonal to the axis. The end edge flat plate part 35 and the intermediate flat plate part 33 are formed in a stepped shape in which they are shifted in the axial direction in parallel with each other and include the ring part 34.

The head cap 14 is mounted on the tubular protective cover 13 to close one end thereof. In this state, the small diameter shaft part 22 of the rod 12 is inserted into the through-hole 32 of the head cap 14, and the head cap 14 comes into contact with an end face of the large diameter shaft part 21 which is close to the small diameter shaft part 22. The mounting member 15 is made of a metal, and has an annular shape. The mounting member 15 is press-fitted onto the small diameter shaft part 22. Thereby, the head cap 14 coming into contact with an end face of the large diameter shaft part 21 of the rod 12 is held by this end face. As a result, the head cap 14 is fixed to the rod 12. The head cap 14 may be fixed to the rod 12 in a state in which the head cap 14 is mounted on the protective cover 13 in advance. Otherwise, in a state in which the head cap 14 is previously mounted on the rod 12, the protective cover 13 may be mounted.

The protective cover 13 is made of a synthetic resin. The protective cover 13 has a cylindrical trunk part 41 that is formed at an intermediate portion in the axial direction and has a constant diameter, a mounting part 42 that is formed at one end side thereof in the axial direction, and a length adjusting part 43 that is formed at the other end in the axial direction and has an approximately cylindrical shape. In other words, in an axial direction (hereinafter referred to as a cover axial direction) of the protective cover 13, the length adjusting part 43 is formed at the side opposite to the mounting part 42 of the trunk part 41, and the mounting part 42 is formed at the side opposite to the length adjusting part 43 of the trunk part 41.

The mounting part 42 has an approximately cylindrical opening 46 that is formed at the side opposite to the trunk part 41, an approximately flat plate-shaped locking plate part 47 that extends from one end side of the opening 46 in the cover axial direction outward in a radial direction (hereinafter referred to as a cover radial direction) of the protective cover 13, and a tubular part 48 that extends in the axial direction in which an outer circumferential edge of the locking plate part 47 and one end edge of the trunk part 41 in the cover axial direction are connected. Locking convex parts 49 protruding inward in the cover radial direction are formed at a plurality of places of the tubular part 48 at intervals in a circumferential direction (hereinafter referred to as a cover circumferential direction) of the protective cover 13.

The head cap 14 is fitted onto an approximately cylindrical fitting tubular part 50 of the tubular part 48 between the locking plate part 47 and the locking convex parts 49 at an outer circumferential edge of the mounting part 42. In this state, the head cap 14 is sandwiched from both sides in the axial direction by the locking plate part 47 and the plurality of locking convex parts 49. Thereby, the head cap 14 is integrated into the protective cover 13 such that radial movement relative to the protective cover 13 is regulated by the fitting tubular part 50, and axial movement is regulated by the locking plate part 47 and the locking convex parts 49. In other words, the mounting part 42 of one end side of the protective cover 13 in the axial direction is mounted on the head cap 14 of the rod 12 side. The head cap 14 is inserted into the length adjusting part 43 and the trunk part 41, and rides over the locking convex parts 49 while elastically deforming the locking convex parts 49 and the fitting tubular part 50. Thereby, as described above, the head cap 14 is mounted on the mounting part 42.

Figure 2:
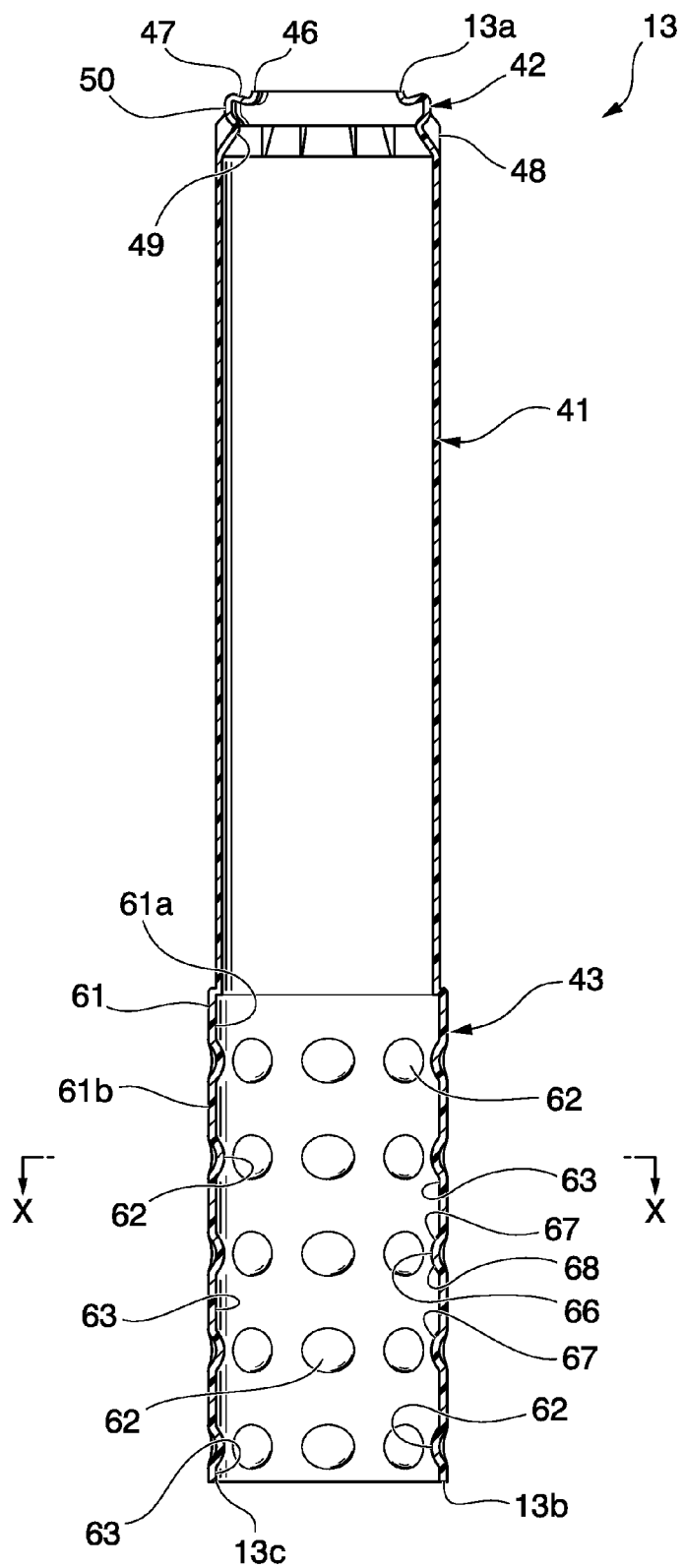
FIG. 2 is a sectional view illustrating the protective cover of the cylinder device of the first embodiment according to the present invention.

As illustrated in FIG. 2, the length adjusting part 43 is configured of a range of at least a part of the other end side, in the cover axial direction, which is the side opposite to the mounting part 42 of one end side of the protective cover 13 in the cover axial direction. This length adjusting part 43 has a main tube part 61 that is formed in a cylindrical shape whose inner and outer diameters are slightly greater than those of the trunk part 41 and which has a constant diameter, and a plurality of bulging parts 62 that are formed at the main tube part 61 at intervals in the cover axial and circumferential directions and bulge in a curved surface shape inward in the cover radial direction relative to an inner circumferential surface 61*a* of the main tube part 61. The bulging parts 62 most protrude from the inner circumferential surface 61*a* at the center in the cover axial direction and at the center in the cover circumferential direction, and are reduced in an amount of protrusion from the inner circumferential surface 61*a* toward both sides in the cover axial direction and toward opposite sides in the cover circumferential direction. The bulging parts 62 are substantially constant in thickness, and thus are recessed inward in the cover radial direction from the outer circumferential surface 61*b* of the main tube part 61. When viewed in the cover radial direction, the bulging parts 62 have oval shapes that are long in the cover circumferential direction. The bulging parts 62 are all identical in size.

Figure 3:
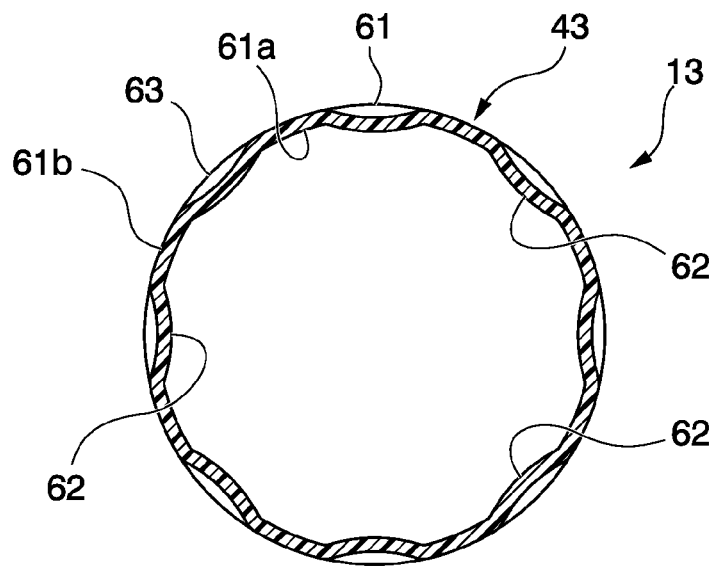
FIG. 3 is a sectional view taken along line X-X of FIG. 2 and illustrating the protective cover of the cylinder device of the first embodiment according to the present invention.

A plurality of bulging parts 62 is formed in a row (a horizontal row) in which the plurality of (particularly, eight) bulging parts 62 positioned at same position in the cover axial direction are formed at regular intervals in the cover circumferential direction as illustrated in FIG. 3, and the row is formed in multiple rows (particularly, five rows) having predetermined intervals in between in the cover axial direction as illustrated in FIG. 2. A portion between the bulging parts 62 adjacent to each other in the cover axial direction of the main tube part 61 and both outside portions of the bulging parts 62 of the opposite ends in the cover axial direction become constant diameter parts 63 in which no bulging parts 62 are formed and which extend with the constant diameter in the cover axial direction. Each row of bulging parts 62 are formed in an arrangement of positions of the cover circumferential direction. In other words, the bulging parts 62 is formed in a row (a vertical row) in which the bulging parts 62 positioned at same position in the cover circumferential direction are formed at multiple places (particularly, five places) at regular intervals in the cover axial direction, and the row (the vertical row) is formed in multiple rows (particularly, eight rows) having predetermined regular intervals in between in the cover circumferential direction.

A virtual circle in which bulged tip positions (in other words, central positions in the cover axial direction) of the plurality of bulging parts 62 positioned in the cover axial direction are connected has a smallest diameter within the length adjusting part 43, and this portion of each of the bulging parts 62 configures a small diameter part 66. Therefore, like the bulging parts 62, the small diameter parts 66 are also partly provided at multiple places (particularly, eight places) in a one row form in the cover circumferential direction, and this row is partly provided in multiple rows (particularly, five rows) in the cover axial direction.

One end sides of the plurality of bulging parts 62 positioned in the cover axial direction are formed closer to the mounting part 42 than the small diameter parts 66 in the cover axial direction, and are configured such that a virtual circle obtained by connecting the one end sides has a diameter reduced toward the small diameter parts 66 sides, and this portion of each of the bulging parts 62 configures a reduced diameter part 67. Therefore, like the bulging parts 62, the reduced diameter parts 67 are also partly provided at multiple places (particularly, eight places) in a one row form in the cover circumferential direction, and this row is partly provided in multiple rows (particularly, five rows) in the cover axial direction.

The other end sides of the plurality of bulging parts 62 positioned in the cover axial direction are formed closer to the side opposite to the mounting part 42 than the small diameter parts 66 in the cover axial direction are configured such that a virtual circle obtained by connecting the other end sides has a diameter enlarged toward the other end sides (the sides opposite to the small diameter parts 66), and this portion of each of the bulging parts 62 constitutes an enlarged diameter part 68. Therefore, like the bulging parts 62, the enlarged diameter parts 68 are also partly provided at multiple places (particularly, eight places) in a one row form in the cover circumferential direction, and this row is partly provided in multiple rows (particularly, five rows) in the cover axial direction.

Since the plurality of rows of the bulging parts 62, each of the plurality of rows are configured of the bulging parts 62 positioned at same position in the cover axial direction, are formed having intervals in between in the cover axial direction, each of the reduced diameter parts 67 whose diameters are reduced toward the tip sides of the other ends in the cover axial direction as described above and each of the enlarged diameter parts 68 whose diameters are enlarged toward the tip sides of the other ends in the cover axial direction are alternately formed in the axial direction by disposing the small diameter part 66 therebetween. The constant diameter parts 63 extending with the constant diameter in the axial direction are provided between the enlarged diameter parts 68 and the reduced diameter parts 67. The constant diameter parts 63 have larger diameters than the small diameter parts 66.

For the protective cover 13, a synthetic resin such as high-density polyethylene, polypropylene, polyamide, etc. having relatively high hardness (an extent not to be deformed by gravitational force) is used. These materials are molded by blow molding, which is preferable from the viewpoint of manufacturability. Although not illustrated, at opposite ends of the protective cover 13 in the axial direction immediately after blow molding, residual parts of the blow molding are left, and these residual parts are cut and removed. Thereby, opposite end faces 13a and 13b in the axial direction are formed. One end face 13a of the mounting part 42 side is formed in the opening 46. The other end face 13b is formed at the other end side opposite to the mounting part 42 of the protective cover 13, namely at the side of the length adjusting part 43 which is opposite to the trunk part 41. The end face 13b is formed by a face cut in a direction orthogonal to the cover axial direction at a position other than the small diameter parts 66 of the length adjusting part 43. To be specific, the end face 13b is formed by a face cut in a direction orthogonal to the cover axial direction at a position other than the bulging parts 62, namely at a position of the constant diameter part 63.

As illustrated in FIG. 1, the protective cover 13 is mounted on the rod 12 via the head cap 14 of the rod 12 side, and covers the rod 12 and the cylinder 11 while matching a central axis with the rod 12 and the cylinder 11 in a natural state in which no external force is applied. In this state, a gap is provided between the small diameter parts 66 of the protective cover 13 and the outer circumferential surface 25a of the cylinder body 25 of the cylinder 11. The protective cover 13 is made of a flexible synthetic resin. Although the mounting part 42 is fitted onto the head cap 14 of the rod 12 side, the protective cover 13 is elastically deformed to oscillatably incline the central axis with respect to the rod 12.

When a resin, such as a synthetic rubber, having low hardness (an extent to be deformed by gravitational force) is used, at least the other end side of the protective cover 13 which is opposite to the mounting part 42 can be bent with flexibility.

Figure 4:
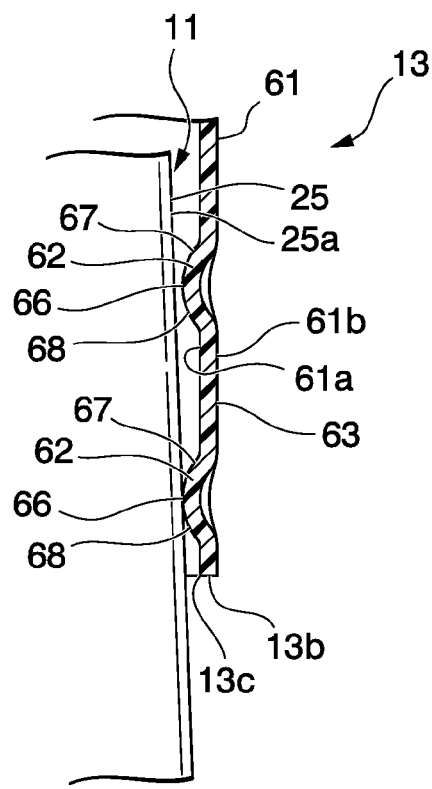
FIG. 4 is an enlarged sectional view of a main part illustrating a state in which the protective cover of the cylinder device of the first embodiment according to the present invention is in contact with a cylinder.

Even if the protective cover 13 is oscillated or bent, as illustrated in FIG. 4, in a state in which the small diameter part 66 closest to the end face 13b comes into contact with the outer circumferential surface 25a of the cylinder 11, the end face 13b and the outer circumferential surface 25a of the cylinder 11 are situated at a position at which they are not in contact with each other in a radial direction. In other words, even in the event of oscillation or deformation of the protective cover 13, the small diameter part 66 closest to the end face 13b comes into contact with the outer circumferential surface 25a of the cylinder 11 in advance to the end face 13b, and regulates contact of the end face 13b with the outer circumferential surface 25a in the cover radial direction.

As illustrated in FIG. 2, the protective cover 13 has a structure in which the rows of the plurality of bulging parts 62 positioned at same position in the cover axial direction are formed in multiple rows (particularly, five rows) at intervals in the cover axial direction, and the plurality of constant diameter parts 63 are formed at intervals in the cover axial direction. The protective cover 13 has a structure in which a position of the end face 13b formed by cutting for a plurality of types of cylinders 11 having different axial lengths, or the like is selectively determined from the plurality of constant diameter parts 63.

That is, for example, with respect to the cylinder 11 having a longest axial length, as illustrated in FIG. 1, the end face 13b is formed by cutting at the constant diameter part 63 of the side opposite to the mounting part 42 of the bulging parts 62 of the fifth row from the trunk part 41 side. With respect to the cylinder 11 having a shorter axial length than this, cutting is performed at the constant diameter part 63 between the bulging parts 62 of the fifth and fourth rows from the trunk part 41 side. With respect to the cylinder 11 having a shorter axial length than this, cutting is performed at the constant diameter part 63 between the bulging parts 62 of the fourth and third rows from the trunk part 41 side. With respect to the cylinder 11 having a shorter axial length than this, cutting is performed at the constant diameter part 63 between the bulging parts 62 of the third and second rows from the trunk part 41 side. With respect to the cylinder 11 having a shorter axial length than this, cutting is performed at the constant diameter part 63 between the bulging parts 62 of the second and first rows from the trunk part 41 side. Thereby, the respective end faces 13b are formed.

Even when the end face 13b formed at a position of any constant diameter part 63 is formed, the protective cover 13 is configured such that, even when the protective cover 13 is oscillated or bent, in the state in which the small diameter part 66 closest to the end face 13b comes into contact with the outer circumferential surface 25a of the cylinder 11, the end face 13b and the outer circumferential surface 25a of the cylinder 11 are not in contact with each other in the radial direction.

Here, the cylinder device may be provided with a cylinder and a rod extending from the cylinder, wherein a tubular protective cover covering the rod and the cylinder is mounted on the rod side. In this cylinder device, an end of the protective cover which is opposite to a mounting side on the rod may be in contact with the outer circumferential surface of the cylinder, and thereby damage may be caused to the outer circumferential surface of the cylinder. Then, peeling of the paint occurs at the outer circumferential surface of the cylinder, or the like, which may become a factor in loss of quality such as rust, corrosion, and so on.

In contrast, according to the cylinder device 10 of the first embodiment, in the state in which the small diameter part 66 closest to the end face 13b of the protective cover 13 comes into contact with the outer circumferential surface 25a of the cylinder 11, the end face 13b and the outer circumferential surface 25a of the cylinder 11 are situated at a position at which they are not in contact with each other in the radial direction. For this reason, an edge part 13c of the inner circumferential surface 61a side of the end face 13b can be prevented from being in contact with the outer circumferential surface 25a of the cylinder 11. Thereby, the painted film of the outer circumferential surface 25a of the cylinder 11 can be prevented from being damaged by the edge part 13c, and rust or corrosion occurring at the cylinder 11 can be suppressed. Therefore, it is possible to improve quality.

Since the reduced diameter parts 67 whose diameters are reduced toward the tip sides of the length adjusting part 43 and the enlarged diameter parts 68 whose diameters are enlarged toward the tip sides of the length adjusting part 43 are alternately formed at the length adjusting part 43 of the protective cover 13 in the axial direction, a plurality of types of protective covers 13 having different axial lengths can be formed by changing a cutting position for common blow molding. Further, with regard to any type, in the state in which the small diameter part 66 closest to the end face 13b of the protective cover 13 comes into contact with the outer circumferential surface 25a of the cylinder 11, the end face 13b and the outer circumferential surface 25a of the cylinder 11 are situated at a position at which they are not in contact with each other in the radial direction, so that the edge part 13c of the inner circumferential surface 61a side of the end face 13b can be prevented from being in contact with the outer circumferential surface 25a of the cylinder 11.

Since the protective cover 13 is formed of the resin material, and since oscillation or deformation easily occurs at the cylinder 11, unless the configuration of the first embodiment is employed, the edge part 13c of the inner circumferential surface 61a side of the end face 13b is easier to be in contact with the outer circumferential surface 25a of the cylinder 11. Therefore, an effect of employing the configuration of the first embodiment is high. Particularly, when a hard resin material suitable for blow molding is used and is in contact, since the painted film of the outer circumferential surface 25a of the cylinder 11 is easily damaged compared to a soft resin material, the effect of employing the configuration of the first embodiment is high. When the protective cover formed of the resin material is used, it is better to use the hard resin material. This is because the soft resin material is not suitable for blow molding and it is necessary to perform injection molding, and the injection molding has poor moldability compared to the blow molding.

Since the mounting part 42 of the protective cover 13 is oscillatably fitted onto the head cap 14 of the rod 12 side, unless the configuration of the first embodiment is employed, the edge part 13c of the inner circumferential surface 61a side of the end face 13b is easy to be in contact with the outer circumferential surface 25a of the cylinder 11. Accordingly, the effect of employing the configuration of the first embodiment is high.

When the length adjusting part 43 of the other end side of the protective cover 13 is configured such that which at least an end thereof at the side opposite to the mounting part 42 can be bent with flexibility, unless the configuration of the first embodiment is employed, the edge part 13c of the inner circumferential surface 61a side of the end face 13b is easy to be in contact with the outer circumferential surface 25a of the cylinder 11. Accordingly, the effect of employing the configuration of the first embodiment is high.

Since the protective cover 13 is provided with the constant diameter parts 63 that have larger diameters than the small diameter parts 66 between the enlarged diameter parts 68 and the reduced diameter parts 67 and extend with the constant diameters in the axial direction, if cutting for length adjustment is performed at the constant diameter parts 63, this cutting becomes easy. The cutting can be performed at the enlarged diameter parts 68 or the reduced diameter parts 67, but not at the small diameter parts 66. As long as the end face is situated at a position at which it is not in contact with the outer circumferential surface 25a of the cylinder 11, it is possible to obtain the effect of the present embodiment.

Since the plurality of small diameter parts 66 are provided in the circumferential direction, a gap in the axial direction can be consistently formed between the protective cover 13 and the cylinder 11. Therefore, even when mud, rainwater, or the like enters therebetween, it can be easily discharged.

Since the protective cover 13 is formed by blow molding, it can be easily formed in the aforementioned shape.

Second Embodiment

Figure 5:
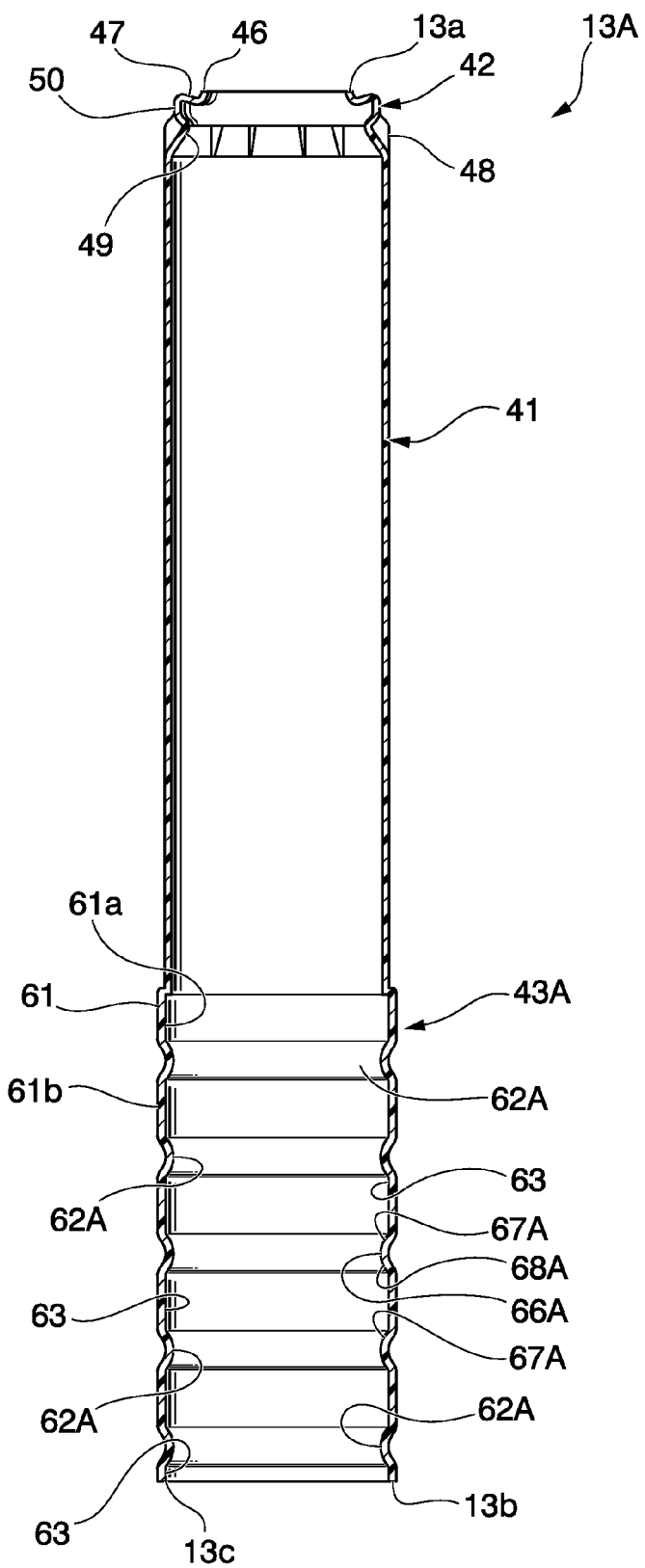
FIG. 5 is a sectional view illustrating a protective cover of a cylinder device of a second embodiment according to the present invention.

Next, a second embodiment will be mainly described centered on portions different from those of the first embodiment on the basis of FIG. 5. Parts common with those of the first embodiment are indicated by the same names and signs.

As illustrated in FIG. 5, in the second embodiment, a protective cover 13A is partly different from the protective cover 13 of the first embodiment. To be specific, a length adjusting part 43A is partly different from the length adjusting part 43 of the first embodiment. Like the first embodiment, the length adjusting part 43A is configured of a range of at least a part of the other end side, in a cover axial direction, which is the side opposite to the mounting part 42 of one end side of the protective cover 13A in the cover axial direction.

The length adjusting part 43A has bulging parts 62A that bulge in a curved surface shape inward in a cover radial direction relative to an inner circumferential surface 61a of a main tube part 61 and are formed in an annular shape that is continuous in a cover circumferential direction. The annular bulging parts 62A are formed at multiple places (particularly, five places) at predetermined intervals in the cover axial direction. The bulging parts 62A most protrude from the inner circumferential surface 61a at the center in the cover axial direction, and are reduced in an amount of protrusion from the inner circumferential surface 61a toward both sides in the cover axial direction. The bulging parts 62A are nearly constant in thickness, and thus are recessed inward in the cover radial direction from an outer circumferential surface 61b of the main tube part 61 in an annular shape. The bulging parts 62A are all identical in size. A portion between the bulging parts 62A adjacent to each other in the cover axial direction of the main tube part 61 and both outside portions of the bulging parts 62 of the opposite ends in the cover axial direction serve as a constant diameter part 63 similar to that of the first embodiment.

Bulged tip positions (in other words, central positions in the cover axial direction) of the bulging parts 62A form a circular shape that is continuous throughout the circumference in the cover circumferential direction, and this portion serves as a small diameter part 66A having a smallest diameter within the length adjusting part 43A. One end sides of the bulging parts 62A, which are formed closer to the mounting part 42 than the small diameter parts 66A in the cover axial direction, form a circular shape that is continuous throughout the circumference in the cover circumferential direction, and this portion serves as a reduced diameter part 67A whose diameter is reduced toward the small diameter part 66A side. The other end sides of the bulging parts 62A which are opposite to the mounting part 42 relative to the small diameter parts 66A in the cover axial direction form a circular shape that is continuous throughout the circumference in the cover circumferential direction, and this portion serves as an enlarged diameter part 68A whose diameter is enlarged toward the side opposite to the small diameter part 66A.

Since the plurality of bulging parts 62A are formed at intervals in the cover axial direction, the reduced diameter part 67A whose diameter is reduced toward the tip side of the other end in the cover axial direction as described above and the enlarged diameter part 68A whose diameter is enlarged toward the tip side of the other end in the cover axial direction are alternately formed in the cover axial direction by disposing the small diameter part 66A therebetween. The constant diameter parts 63 extending with the constant diameter in the cover axial direction have larger diameters than the small diameter parts 66A, and are provided between the enlarged diameter parts 68A and the reduced diameter parts 67A.

The protective cover 13A of the second embodiment is formed to be similar to that of first embodiment, and an end face 13b thereof is formed by a surface cut in a direction orthogonal to the cover axial direction at positions other than the small diameter parts 66A of the length adjusting part 43A. To be specific, the end face 13b is formed by a surface cut in a direction orthogonal to the cover axial direction at a position other than the bulging parts 62A, namely at a position of the constant diameter part 63.

The protective cover 13A is also configured such that, in a state in which the small diameter part 66A closest to the end face 13b comes into contact with an outer circumferential surface 25a of a cylinder 11 (see FIG. 1), the end face 13b and the outer circumferential surface 25a of the cylinder 11 are not in contact with each other in the radial direction.

The protective cover 13A is also configured such that the plurality of constant diameter parts 63 are formed at intervals in the cover axial direction, and a position of the end face 13b formed by cutting is selectively determined from the plurality of constant diameter parts 63. Even when the end face 13b is formed at a position of any constant diameter part 63, the protective cover 13A is configured such that, in the state in which the small diameter part 66A closest to the end face 13b comes into contact with an outer circumferential surface 25a of a cylinder 11, the end face 13b and the outer circumferential surface 25a of the cylinder 11 are not in contact with each other in the radial direction.

According to the aforementioned second embodiment, since the bulging parts 62A of the protective cover 13A form the circular shape that is continuous in the cover circumferential direction, strength against the deformation of the protective cover 13A can be improved. A shape of a metal molding in the event of blow molding can also simplified, and a manufacturing cost can be reduced.

When the protective cover 13A is formed using a flexible material such as a synthetic rubber, it may be formed in a bellows shape.

Third Embodiment

Figure 6:
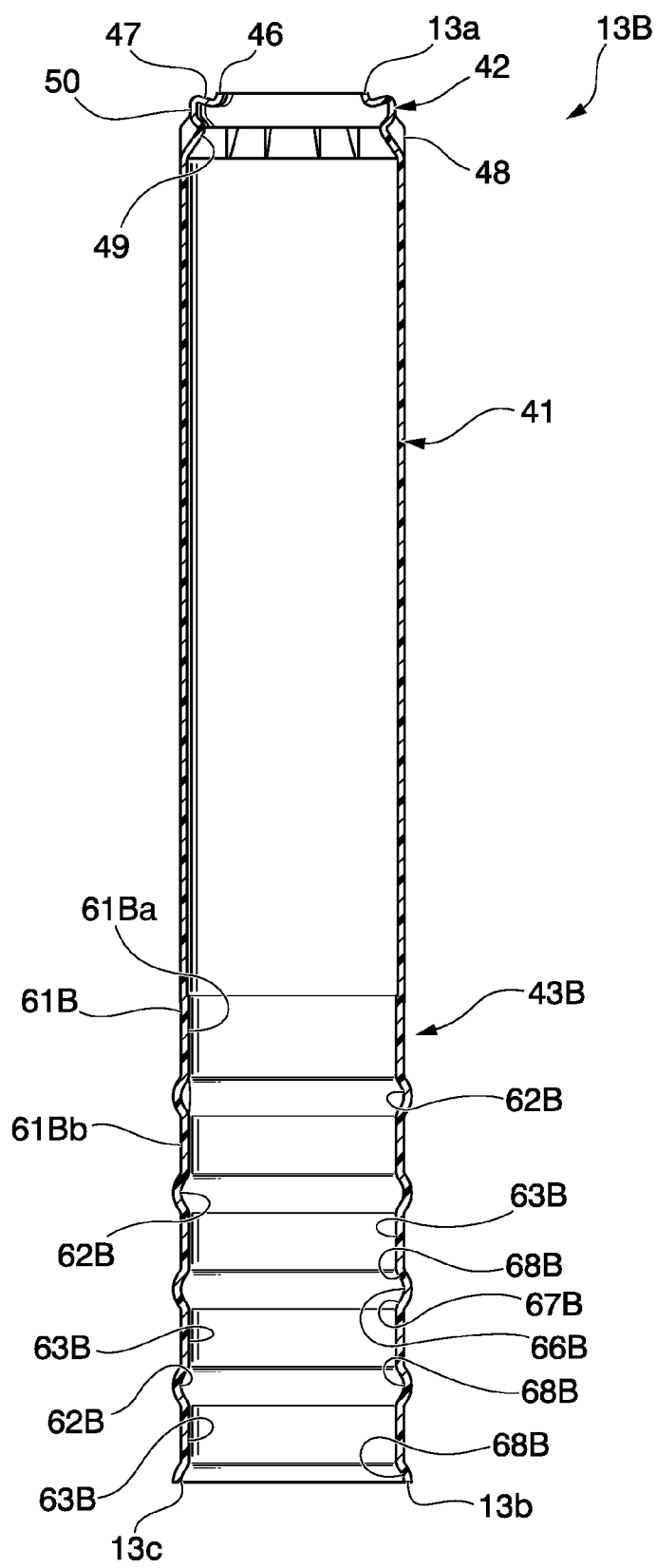
FIG. 6 is a sectional view illustrating a protective cover of a cylinder device of a third embodiment according to the present invention.

Next, a third embodiment will be mainly described centered on portions different from those of the first embodiment on the basis of FIG. 6. Parts common with those of the first embodiment are indicated by the same names and signs.

As illustrated in FIG. 6, in the third embodiment, a protective cover 13B is partly different from the protective cover 13 of the first embodiment. To be specific, a length adjusting part 43B is partly different from the length adjusting part 43 of the first embodiment. Like the first embodiment, the length adjusting part 43B is configured of a range of at least a part of the other end side, in a cover axial direction, which is the side opposite to a mounting part 42 of one end side of the protective cover 13A in the cover axial direction.

The length adjusting part 43B has a main tube part 61B that is formed in a cylindrical shape whose inner and outer diameters are slightly smaller than those of a trunk part 41 and which has a constant diameter. Concave parts 62B recessed outward in a curved surface shape in a cover radial direction further than an inner circumferential surface 61Ba of the main tube part 61B are formed at the length adjusting part 43B in an annular shape that is continuous in the cover circumferential direction. The annular concave parts 62B are formed at multiple places (particularly, five places) at predetermined intervals in the cover axial direction. The concave parts 62B are substantially constant in thickness, and thus are formed to bulge outward in a curved surface shape in the cover radial direction further than the inner circumferential surface 61Ba of the main tube part 61B. The concave parts 62B serve as large diameter parts 66B that are most recessed from the inner circumferential surface 61Ba at the center in the cover axial direction, and are reduced in amount of recess from the inner circumferential surface 61Ba toward both sides in the cover axial direction. A small diameter part 63B at which the main tube part 61B extends with the constant diameter in the axial direction is present between the concave parts 62B.

Bottom positions (in other words, central positions in the cover axial direction) of the concave parts 62B is formed in a circular shape that is continuous throughout the circumference in the cover circumferential direction, and this portion serves as a large diameter parts 66B having a largest diameter within the length adjusting part 43B. One end sides of the concave parts 62B are formed closer to the mounting part 42 than the large diameter parts 66B in the cover axial direction, and form a circular shape that is continuous throughout the circumference in the cover circumferential direction, and this portion serves as an enlarged diameter part 68B whose diameter is enlarged toward the large diameter part 66B side. The other end sides of the concave parts 62B which are opposite to the mounting part 42 relative to the large diameter part 66B in the cover axial direction is formed in a circular shape that is continuous throughout the circumference in the cover circumferential direction, and this portion serves as a reduced diameter part 67B whose diameter is reduced toward the side opposite to the large diameter part 66B.

Since the annular concave parts 62B are formed in multiple rows at intervals in the cover axial direction, the reduced diameter part 67B whose diameter is reduced toward the tip side of the other end in the cover axial direction as described above and the enlarged diameter part 68B whose diameter is enlarged toward the tip side of the other end in the cover axial direction are alternately formed in the axial direction by disposing the small diameter part 63B therebetween. The small diameter part 63B has a diameter smaller than that of the large diameter part 66B. An R chamfered shape is provided between the reduced diameter part 67B and the small diameter part 63B.

The protective cover 13B of the third embodiment is also formed to be similar to that of first embodiment, and an end face 13b thereof is formed by a surface cut in a direction orthogonal to the cover axial direction at positions other than the small diameter parts 63B of the length adjusting part 43B. To be specific, the end face 13b is formed by a surface cut in a direction orthogonal to the cover axial direction at positions of the large diameter parts 66B of the concave parts 62B.

The protective cover 13B is configured such that, in a state in which the small diameter part 63B closest to the end face 13b comes into contact with an outer circumferential surface 25a of a cylinder 11 (see FIG. 1), the end face 13b and the outer circumferential surface 25a of the cylinder 11 are not in contact with each other in the radial direction.

In addition, the protective cover 13B is also configured such that the plurality of large diameter parts 66B are formed at intervals in the cover axial direction, and a position of the end face 13b formed by cutting is selectively determined from the plurality of large diameter parts 66B arranged in the cover axial direction. Even when the end face 13b is formed at a position of any large diameter part 66B, the protective cover 13B is configured such that, in the state in which the small diameter part 63B closest to the end face 13b comes into contact with the outer circumferential surface 25a of the cylinder 11, the end face 13b and the outer circumferential surface 25a of the cylinder 11 are not in contact with each other in the radial direction.

Fourth Embodiment

Figure 7:
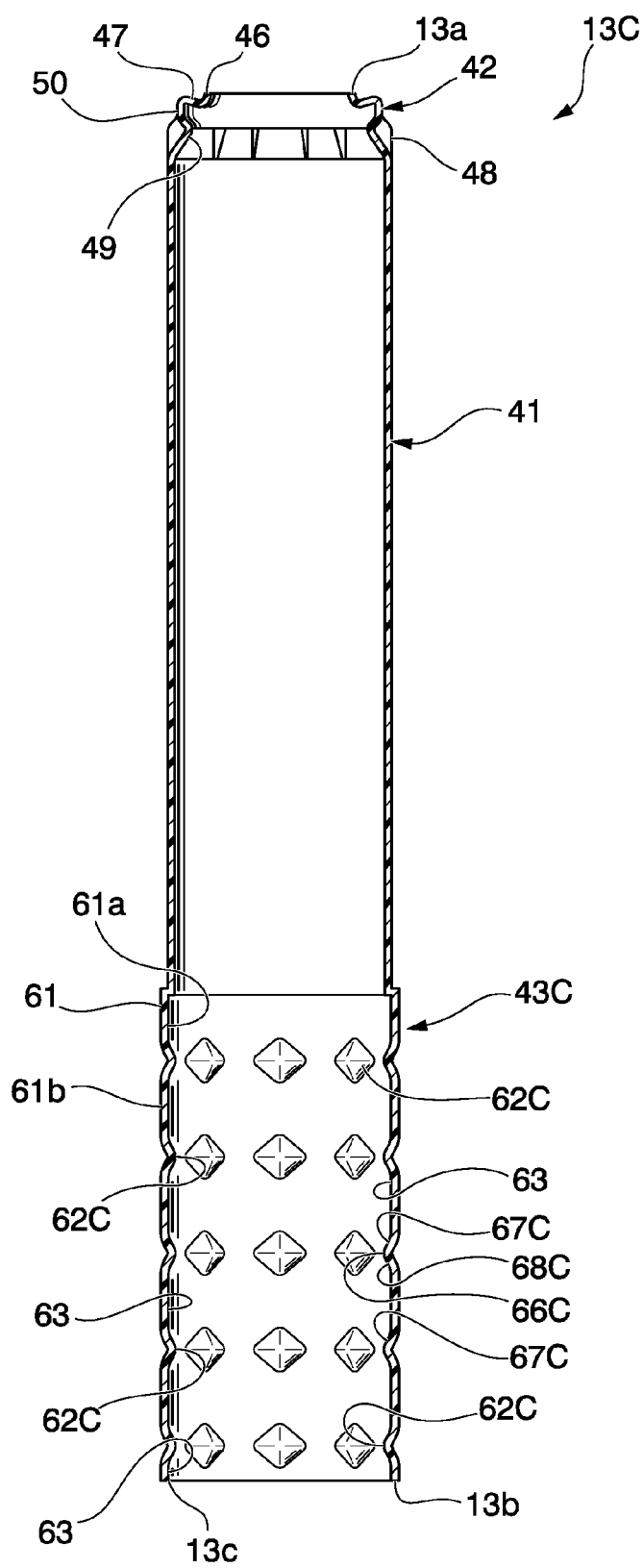
FIG. 7 is a sectional view illustrating a protective cover of a cylinder device of a third embodiment according to the present invention.

Next, a fourth embodiment will be mainly described centered on portions different from those of the first embodiment on the basis of FIG. 7. Parts common with those of the first embodiment are indicated by the same names and signs.

As illustrated in FIG. 7, in the fourth embodiment, a protective cover 13C is partly different from the protective cover 13 of the first embodiment. To be specific, a length adjusting part 43C is partly different from the length adjusting part 43 of the first embodiment. Like the first embodiment, the length adjusting part 43C is configured of a range of at least a part of the other end side, in a cover axial direction, which is the side opposite to a mounting part 42 of one end side of the protective cover 13C in the cover axial direction.

The length adjusting part 43C has a plurality of bulging parts 62C that bulge inward in a pyramid shape in a cover radial direction relative to an inner circumferential surface 61a of a main tube part 61 as in the first embodiment. The bulging parts 62C are formed in a curved surface shape at protruding tip sides thereof. The bulging parts 62C most protrude from the inner circumferential surface 61a at the center in the cover axial direction and at the center in a cover circumferential direction, and are reduced in amount of protrusion from the inner circumferential surface 61a toward both sides in the cover axial direction and toward both sides in the cover circumferential direction. The bulging parts 62C are approximately constant in thickness, and thus are recessed inward from the outer circumferential surface 61b of the main tube part 61 in the cover radial direction. When viewed in the cover radial direction, the bulging parts 62C have rhombic shapes that are long in the cover circumferential direction. All of the bulging parts 62C are identical in size.

The bulging parts 62C are disposed at the same positions as the bulging parts 62 of the first embodiment. A virtual circle in which bulged tip positions (in other words, central positions in the cover axial direction) of the plurality of bulging parts 62C positioned at same position in the cover axial direction are connected has a smallest diameter within the length adjusting part 43C, and this portion of each of the bulging parts 62C serves as a small diameter part 66C. One end sides of the plurality of bulging parts 62C positioned at same position in the cover axial direction are formed closer to the mounting part 42 than the small diameter parts 66C in the cover axial direction, and are configured such that a virtual circle obtained by connecting the one end sides has a diameter reduced toward the small diameter part 66C side, and this portion of each of the bulging parts 62C serves as a reduced diameter part 67C. A virtual circle in which the other end sides of the bulging parts 62C positioned at same position in the cover axial direction wherein the other end sides are opposite to the mounting part 42 relative to the small diameter parts 66C in the cover axial direction is enlarged in diameter toward the other end sides, and this portion of each of the bulging parts 62C serves as an enlarged diameter part 68C.

Since rows of the plurality of bulging parts 62C positioned at same position in the cover axial direction are formed in multiple rows at intervals in the cover axial direction, the reduced diameter part 67C whose diameter is reduced toward the tip side of the other end in the cover axial direction as described above and the enlarged diameter part 68C whose diameter is enlarged toward the tip side of the other end in the cover axial direction are alternately formed in the axial direction by disposing the small diameter part 66C therebetween. A constant diameter part 63 having a diameter larger than that of the small diameter part 66C as in the first embodiment is provided between the enlarged diameter part 68C and the reduced diameter part 67C.

The protective cover 13C of the fourth embodiment is also formed to be similar to that of first embodiment, and an end face 13b thereof is formed by a surface cut in a direction orthogonal to the cover axial direction at positions other than the small diameter parts 66C of the length adjusting part 43C. To be specific, the end face 13b is formed by a surface cut in a direction orthogonal to the cover axial direction at positions other than the bulging parts 62C, namely at positions of the constant diameter parts 63.

In the protective cover 13C, in a state in which the small diameter part 66C closest to the end face 13b comes into contact with an outer circumferential surface 25a of a cylinder 11 (see FIG. 1), the end face 13b and the outer circumferential surface 25a of the cylinder 11 are not in contact with each other in the radial direction.

The protective cover 13C is also configured such that the plurality of constant diameter parts 63 are formed at intervals in the cover axial direction, and a position of the end face 13b formed by cutting is selectively determined from the plurality of constant diameter parts 63. Even when the end face 13b is formed at a position of any constant diameter part 63, the protective cover 13C is configured such that, in the state in which the small diameter part 66C closest to the end face 13b comes into contact with the outer circumferential surface 25a of the cylinder 11, the end face 13b and the outer circumferential surface 25a of the cylinder 11 are not in contact with each other in the radial direction.

Here, the bulging parts 62C of the fourth embodiment may be modified into bulging parts that are continuous in the cover circumferential direction like a modified example of the second embodiment to the first embodiment. In this case, the bulging parts have shapes in which two annular tapered surfaces interconnect small diameter sides.

Figure 8:
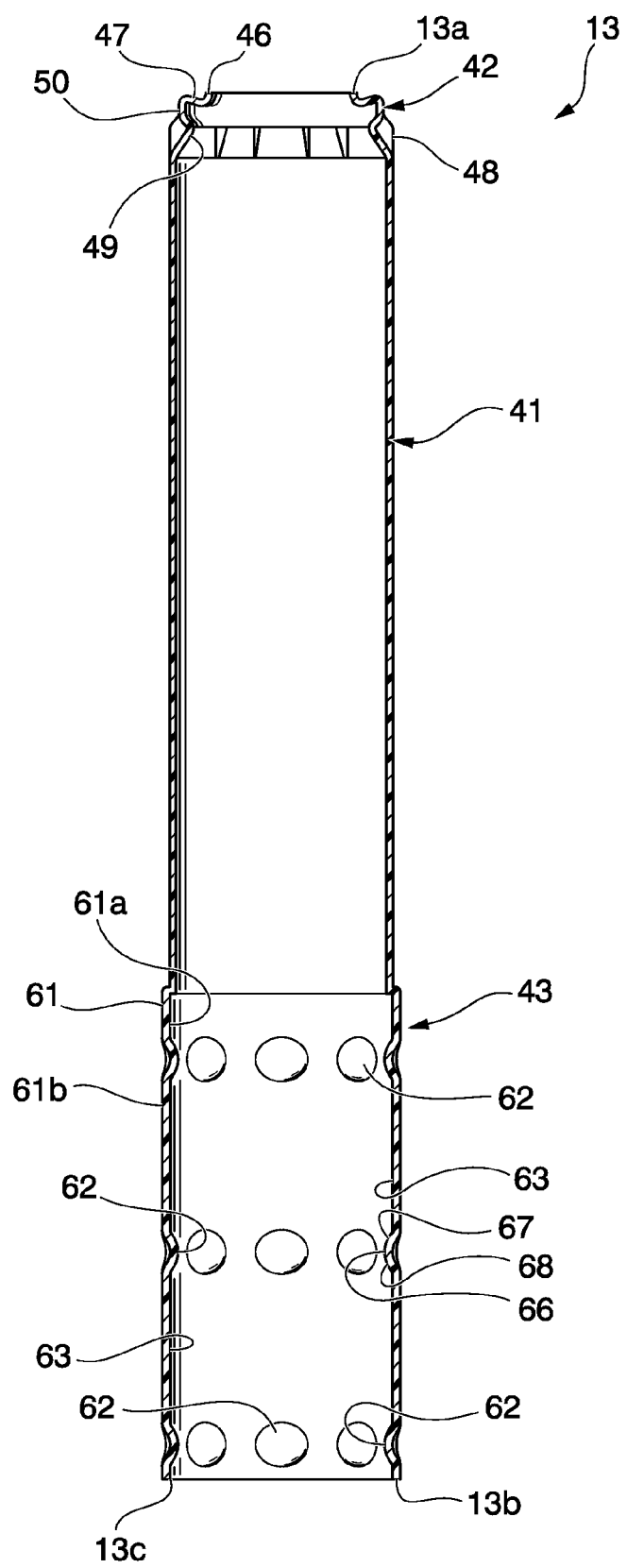
FIG. 8 is a sectional view illustrating a modified example of the protective cover of the cylinder device of the first embodiment according to the present invention.

In the first to fourth embodiments, the case in which five types of protective covers having different lengths are formed from one type of blow molding has been described by way of example. Of course, the invention is not limited to this. For example, as a modified example to the first embodiment illustrated in FIG. 8, the number of rows of bulging parts 62 may be reduced or increased. If the number of rows of bulging parts 62 is reduced, since the lengths of the constant diameter parts 63 can be increased, cutting at positions of the constant diameter parts 63 is made easy.

In addition, the example in which the protective cover 13 is formed of the synthetic resin has been described, but the material of the protective cover 13 may use a material such as a metal. Even when the protective cover is formed of a metal material, a plurality of types of molds are not required depending on a difference in length between the protective covers in an axial direction, and moreover a time required for re-setup for displacing the mold is also unnecessary. For this reason, productivity can be improved. When the metal is used, the protective cover is not typically oscillated, but it may be oscillated, for instance, during traveling on a very rough road. In a vehicle used at this rough land, the present embodiment is effective.

The embodiments described above are characterized in that, in a cylinder device which includes a cylinder and a rod extending from the cylinder and in which a tubular protective cover covering the rod and the cylinder is mounted on the rod, a mounting part mounted on the rod side is provided at one end side of the protective cover in an axial direction; on at least the other end side of the protective cover in the axial direction, reduced diameter parts whose diameters are reduced toward tip sides of the other ends and enlarged diameter parts whose diameters are enlarged toward the tip sides of the other ends are alternately formed in the axial direction via small diameter parts in between; an end face of the other end side of the protective cover is formed by a surface cut at positions other than the small diameter parts; in a state in that the small diameter part closest to the end face comes into contact with an outer circumferential surface of the cylinder, the end face and the outer circumferential surface of the cylinder are situated at a position at which they are not in contact with each other in the radial direction. Thereby, the end face of the other end side of the protective cover can be prevented from being in contact with the outer circumferential surface of the cylinder. Thus, a painted film of the outer circumferential surface of the cylinder can be prevented from being damaged, and rust or corrosion occurring at the cylinder can be suppressed. Therefore, it is possible to improve a quality. Since the reduced diameter parts and the enlarged diameter parts are alternately formed in the axial direction, a plurality of types of protective covers having different lengths in the axial direction can be formed from a common molding.

Since the protective cover is formed of a resin material, an effect of employing the constitution is high.

Moreover, since the mounting part of the protective cover is oscillatably fitted onto the rod side, an effect of employing the configuration is high.

In addition, since the at least other end side of the protective cover can be bent with flexibility, an effect of employing the configuration is high.

Since the constant diameter part that has a larger diameter than the small diameter part and extends with the constant diameter in the axial direction is provided between the enlarged diameter part and the reduced diameter part for the protective cover, if cutting for adjusting a length is performed at the constant diameter parts, this cutting is made easy.

Since the plurality of small diameter parts are partly provided in the circumferential direction, a gap can always be formed between the protective cover and the cylinder. Therefore, even if mud or rainwater enters between the protective cover and the cylinder, it can be easily discharged.

In addition, since the protective cover is formed by blow molding, it can be easily formed in the above shape.

INDUSTRIAL APPLICABILITY

According to the aforementioned cylinder device, it is possible to improve a quality.

REFERENCE SIGNS LIST

10 Cylinder device
11 Cylinder
12 Rod
13, 13A, 13B, 13C Protective cover
13b End face
63B Small diameter part
66, 66A, 66C Small diameter part
25a Outer circumferential surface
42 Mounting part
67 Reduced diameter part

68 Enlarged diameter part
63 Constant diameter part

The invention claimed is:

1. A cylinder device comprising:
a cylinder;
a rod configured to extend from the cylinder; and
a tubular protective cover covering the rod and the cylinder being mounted on the rod, wherein:
the tubular protective cover includes a cylindrical trunk part that is formed at an intermediate portion in an axial direction and has a constant diameter, a mounting part provided at a first end side of the protective cover in the axial direction, the mounting part configured to be mounted on the rod,
a second end side of the protective cover in the axial direction is provided with a length adjusting part,
the length adjusting part includes a plurality of small diameter parts, a plurality of reduced diameter parts whose diameters are reduced toward the small diameter parts, and a plurality of enlarged diameter parts whose diameters are enlarged away from the small diameter parts, the reduced diameter parts and the enlarged diameter parts being alternately formed in the axial direction with the small diameter parts in between,
each of the plurality of reduced diameter parts and each of the plurality of enlarged diameter parts is formed with a concave part recessed outward in a curved surface shape in a radial direction further than an inner circumferential surface of the trunk part and bulged outward in a curved surface shape in the radial direction further than an outer circumferential surface of the trunk part,
an end face of the length adjusting part is formed by a cut surface of the concave part, and
a clearance is provided between the end face and an outer circumferential surface of the cylinder in the radial direction in a state in which one of the small diameter parts closest to the end face comes into contact with the outer circumferential surface of the cylinder.

2. The cylinder device according to claim 1, wherein the protective cover is formed of a resin material.

3. The cylinder device according to claim 1, wherein the mounting part of the protective cover is oscillatably fitted onto the rod.

4. The cylinder device according to claim 1, wherein at least the length adjusting part of the protective cover is bendable with flexibility.

5. The cylinder device according to claim 1, wherein the protective cover is formed by blow molding.

* * * * *